United States Patent
Wang et al.

(10) Patent No.: US 11,933,999 B2
(45) Date of Patent: Mar. 19, 2024

(54) OPTICAL STRUCTURE FILM AND LIGHT SOURCE MODULE

(71) Applicant: Coretronic Corporation, Hsin-Chu (TW)

(72) Inventors: Wen-Chun Wang, Hsin-Chu (TW); Chih-Jen Tsang, Hsin-Chu (TW); Chung-Wei Huang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/072,707

(22) Filed: Dec. 1, 2022

(65) Prior Publication Data
US 2023/0204846 A1 Jun. 29, 2023

Related U.S. Application Data

(60) Provisional application No. 63/293,840, filed on Dec. 27, 2021.

(30) Foreign Application Priority Data

Mar. 10, 2022 (CN) .......................... 202210229053.5

(51) Int. Cl.
*F21V 8/00* (2006.01)
(52) U.S. Cl.
CPC .................. *G02B 6/0051* (2013.01)
(58) Field of Classification Search
CPC .......................... G02F 1/133607; G02B 6/0053
See application file for complete search history.

(56) References Cited

U.S. PATENT DOCUMENTS

| 2023/0013893 | A1* | 1/2023 | Chen | G02B 6/0051 |
| 2023/0133614 | A1* | 5/2023 | Chiu | G02F 1/133606 |
| | | | | 362/97.2 |
| 2023/0152626 | A1* | 5/2023 | Nishikawa | G02F 1/133605 |
| | | | | 349/62 |
| 2023/0213814 | A1* | 7/2023 | Walker | G02B 6/0053 |
| | | | | 362/84 |
| 2023/0324597 | A1* | 10/2023 | Chang | G02B 6/0051 |
| | | | | 362/606 |

FOREIGN PATENT DOCUMENTS

TW 202113438 4/2021

* cited by examiner

*Primary Examiner* — Eric T Eide
(74) *Attorney, Agent, or Firm* — JCIPRNET

(57) ABSTRACT

An optical structure film and a light source module are provided. The optical structure film includes multiple optical unit microstructures. Each of the optical unit microstructures has four side surfaces and an inwardly concave beam splitting surface. The beam splitting surface is respectively connected to the side surfaces, and the beam splitting surface has four endpoints when viewed from a front viewing angle. Connection lines of the four endpoints form a rectangle. The beam splitting surface includes at least one beam splitting curved surface. A junction of the at least one beam splitting curved surface and one of the four side surfaces is a first line segment. A projection of a midpoint of an edge of the rectangle on the beam splitting surface overlaps with a relative extreme point of the first line segment.

17 Claims, 15 Drawing Sheets

OPTICAL STRUCTURE FILM AND LIGHT SOURCE MODULE

CROSS-REFERENCE TO RELATED APPLICATION

This application claims the priority benefit of U.S. Provisional Application No. 63/293,840, filed on Dec. 27, 2021 and China Application No. 202210229053.5, filed on Mar. 10, 2022. The entirety of each of the above-mentioned patent applications is hereby incorporated by reference herein and made a part of this specification.

BACKGROUND

Technical Field

The disclosure relates to an optical structure film and a light source module, and particularly relates to an optical structure film with a microstructure and a light source module.

Description of Related Art

Current electronic devices mostly use flat panel display modules to display images, among which the technology of liquid crystal display modules is relatively mature and popular. However, since the display panel of the liquid crystal display module itself cannot emit light, a backlight module is provided under the display panel to provide light required for displaying images.

In recent years, due to characteristics such as good local dimming and high contrast of mini light emitting diodes, the industry has begun to research and develop the structure of direct-type backlight modules with mini light emitting diodes as light emitting elements to meet the requirements of high dynamic range imaging specifications currently. However, since the light source architecture using the mini light emitting diode as the light emitting element is formed by arranging point light sources in an array, a bright point defect is prone to appear directly above the mini light emitting diode, which affects visual effect and uniformity. Therefore, various technical solutions for eliminating the bright point emerge as required.

For example, one solution is to place a diffusion film with printed dots on a light emitting element, and use shading dots to shield a bright point generated by the light emitting element. However, since the position and distribution of the shading dots need to be designed in response to the bright point caused by the light emitting element, there is a requirement for alignment, so the requirements for mounting precision of the light emitting element and the tolerance of module assembly are relatively high. Once an alignment error occurs, the shading of the dots will be incomplete, which will have a greater impact on visual effect and uniformity.

The second solution is to use an optical microstructure with beam splitting characteristics, such as a V-shaped groove structure or a pyramid structure, to form an optical structure film to split a bright point generated by a light emitting element, and the bright point may be fogged in conjunction with other optical films. However, the bright point split through the V-shaped groove structure or the pyramid structure will form an obvious ghost image, which will easily affect uniformity.

The third solution is to add scattering particles into an optical film, and use randomly scattered light rays after the light rays are irradiated on the scattering particles to achieve the effect of suppressing the bright point phenomenon. However, when the concentration of the scattering particles reaches a certain level, the diffusion capacity cannot be effectively improved, so the effect of suppressing the bright point phenomenon is limited.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides an optical structure film, which can suppress a bright point phenomenon formed by a light emitting element.

The disclosure provides a light source module, which has the advantage of being thin and good visual effect and uniformity.

Other objectives and advantages of the disclosure can be further understood from the technical features disclosed in the disclosure.

To achieve one, part, or all of the above objectives or other objectives, an embodiment of the disclosure provides an optical structure film. The optical structure film includes multiple optical unit microstructures. Each of the optical unit microstructures has four side surfaces and an inwardly concave beam splitting surface. The beam splitting surface is respectively connected to the side surfaces and the beam splitting surface has four endpoints when viewed from a front viewing angle. Connection lines of the four endpoints form a rectangle. The beam splitting surface includes at least one beam splitting curved surface. A junction between the at least one beam splitting curved surface and one of the four side surfaces is a first line segment. A projection of a midpoint of an edge of the rectangle on the beam splitting surface overlaps with a relative extreme point of the first line segment.

To achieve one, part, or all of the above objectives or other objectives, an embodiment of the disclosure provides a light source module. The light source module includes multiple light emitting elements and the optical structure film. The light emitting elements are configured to provide a light beam. The optical structure film is located on a transmission path of the light beam and also includes a substrate. The substrate has a first surface and a second surface back facing each other. The first surface faces the light emitting elements.

Based on the above, the embodiments of the disclosure have at least one of the following advantages or effects. In the embodiments of the disclosure, the light beam emitted by the light emitting element may pass through the beam splitting surface of the optical unit microstructure of the optical structure film to disperse a bright point formed by the light beam into a light spot. Also, through the structural design of the beam splitting curved surface of the beam splitting surface of the optical unit microstructure, the brightness per unit area within the range of the light speckle can be effectively reduced. In addition, the optical unit microstructures may be closely arranged, so that alignment is not required, and the requirements for mounting precision of the light emitting element and the tolerance of module assembly can be reduced. In addition, in the case where the spacing between the light emitting elements is increased, no obvious bright point phenomenon occurs, thereby reducing costs due to the number of light emitting elements. Alternatively, in the case where the number of light emitting elements remains fixed and the spacing is smaller, the uniformity of the light emitting elements can be further improved to implement better visual effect. Moreover, through the above configuration, the optical distance of the light source module can be effectively reduced, thereby reducing the module thickness of the light source module.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
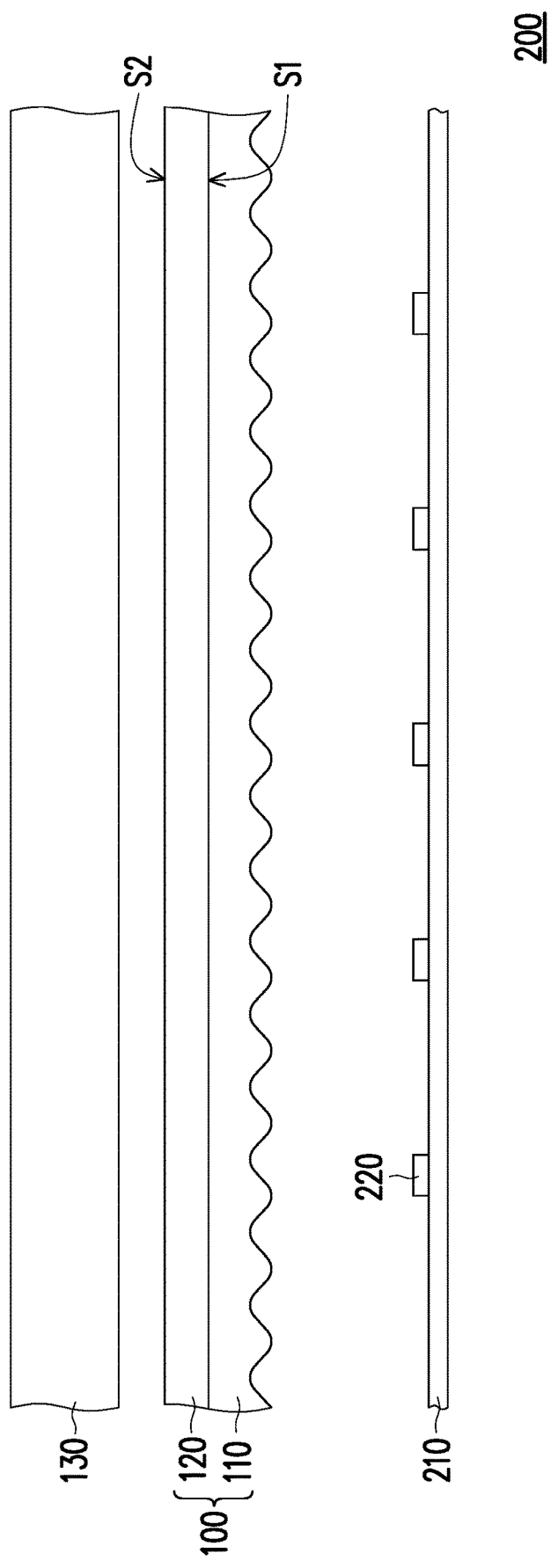
FIG. 1 is a schematic cross-sectional view of a light source module according to an embodiment of the disclosure.
Figure 2A:
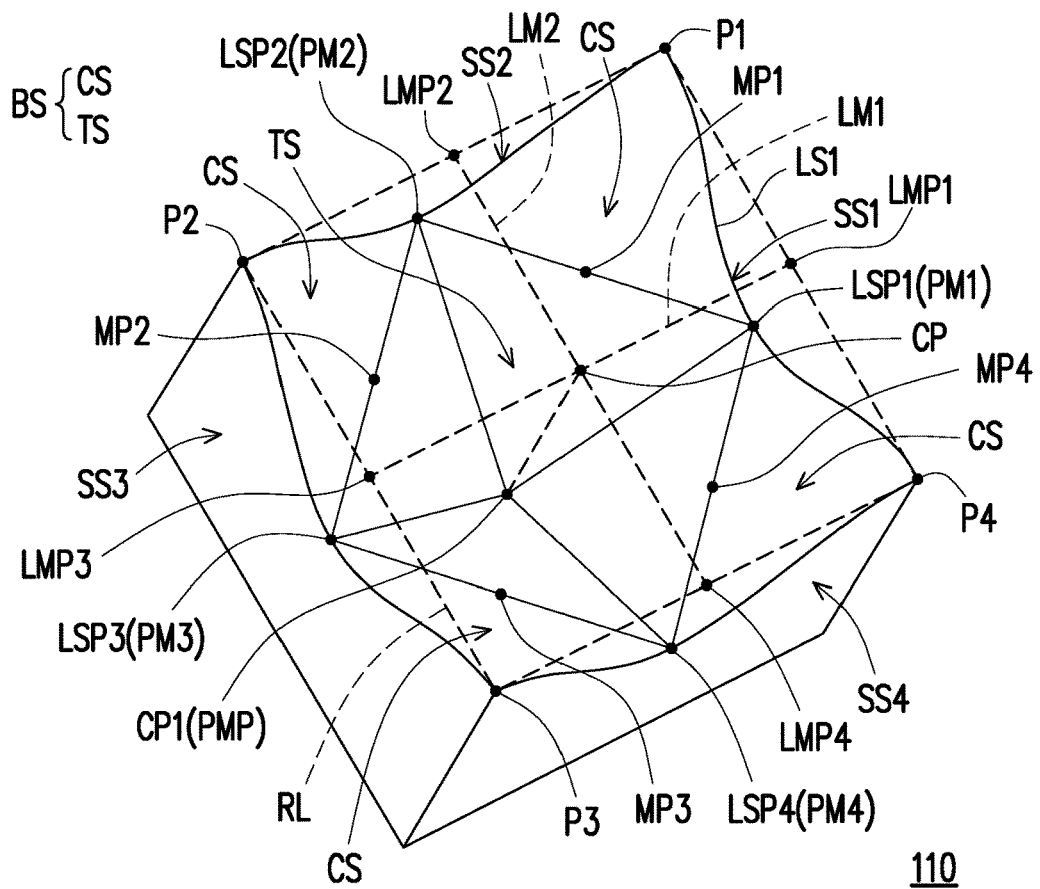
FIG. 2A is a schematic perspective view of an optical unit microstructure of an optical structure film of FIG. 1.
Figure 2B:
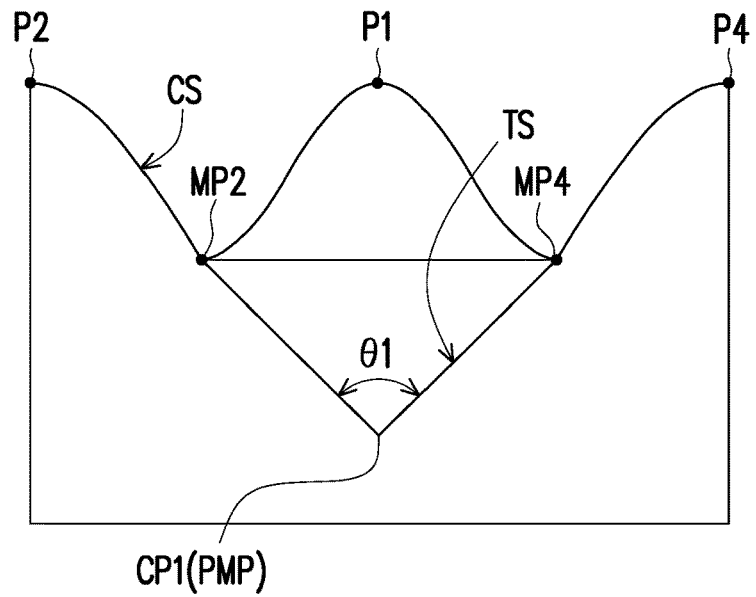
FIG. 2B is a cross-sectional view of the optical unit microstructure of FIG. 2A with a diagonal line of a rectangle as a cross-sectional line.

FIG. 1 is a schematic cross-sectional view of a light source module according to an embodiment of the disclosure. FIG. 2A is a schematic perspective view of an optical unit microstructure of an optical structure film of FIG. 1. FIG. 2B is a cross-sectional view of the optical unit microstructure of FIG. 2A with a diagonal line of a rectangle as a cross-sectional line.

Figure 2C:
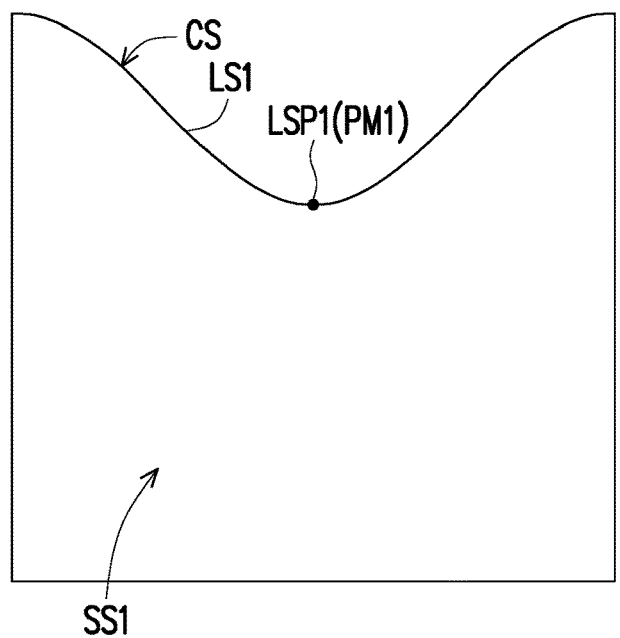
FIG. 2C is a side view of the optical unit microstructure of FIG. 2A.

FIG. 2C is a side view of the optical unit microstructure of FIG. 2A. Please refer to FIG. 1. In the embodiment, a light source module 200 includes a light emitting element substrate 210, multiple light emitting elements 220, and an optical structure film 100. The light emitting elements 220 are located on the light emitting element substrate 210 and are configured to respectively provide a light beam. In the embodiment, the light emitting element 220 is, for example, a mini light emitting diode.

Specifically, as shown in FIG. 1, in the embodiment, the optical structure film 100 is located on a transmission path of the light beam and includes multiple optical unit microstructures 110 and a substrate 120. The substrate 120 has a first surface S1 and a second surface S2 back facing each other. The first surface S1 faces the light emitting elements 220. The optical unit microstructures 110 are formed on the first surface S1. When the light emitting element 220 emits light, the light beam passes through the optical structure film 100 to disperse a bright point formed by the light beam into a light spot, so as to provide a uniform surface light source. In other embodiments, the light source module 200 may further include a diffusion film 130, and the second surface S2 of the substrate 120 faces the diffusion film 130, that is, the optical structure film 100 is disposed between the diffusion film 130 and the light emitting element substrate 210. The detailed structure of the optical unit microstructure 110 will be further explained below with reference to FIG. 2A to FIG. 2C.

Specifically, as shown in FIG. 2A to FIG. 2C, in the embodiment, each of the optical unit microstructures 110 has four side surfaces SS1, SS2, SS3, and SS4 and an inwardly concave (for example, concave toward the center of the optical unit microstructure 110) beam splitting surface BS. The four side surfaces SS1, SS2, SS3, and SS4 are, for example, respectively perpendicular to the first surface S1 of the substrate 120, and the four side surfaces SS1, SS2, SS3, and SS4 are, for example, perpendicular or parallel to each other. The beam splitting surface BS is respectively connected to the side surfaces SS1, SS2, SS3, and SS4, and the beam splitting surface BS has four endpoints P1, P2, P3, and P4 when viewed from a front viewing angle (for example, along a normal direction of the first surface S1 of the substrate 120). Connection lines of the four endpoints P1, P2, P3, and P4 form a rectangle RL (for example, a square). In other words, the rectangle RL is the outline (for example, the four edges of the rectangle RL respectively correspond to the four side surfaces SS1, SS2, SS3, and SS4) of the optical unit microstructure 110 when viewed from the front. The beam splitting surface BS includes at least one beam splitting curved surface CS and multiple beam splitting inclined surfaces TS. Further, in the embodiment, as shown in FIG. 2A and FIG. 2C, the number of the at least one beam splitting curved surface CS is 4. A junction between the at least one beam splitting curved surface CS and the side surface SS1 is a first line segment LS1. An orthographic projection of a midpoint LMP1 of the edge (e.g., correspond to the side surface SS1) of the rectangle RL on the beam splitting surface BS overlaps with a relative extreme point LSP1 of the first line segment LS1 (the correspondence between midpoints LMP2, LMP3, and LMP4 of the edges of the rectangle RL and relative extreme point LSP2, LSP3, and LSP4 is similar to the above and will not be repeated). In the embodiment, the relative extreme point LSP1 of the first line segment LS1 is the lowest point of the first line segment LS1 shown in FIG. 2C, that is, the position of the first line segment LS1 shown in FIG. 1 that is farthest from the light emitting elements 220 (which also applies to the relative extreme points LSP2, LSP3, and LSP4). On the other hand, as shown in FIG. 2A and FIG. 2B, in the embodiment, the beam splitting inclined surfaces TS intersect at the relative extreme point CP1 of the beam splitting surface BS, and an orthographic projection of an intersection point CP of diagonal lines of the rectangle RL on the beam splitting surface BS overlaps with the relative extreme point CP1 of the beam splitting surface BS. Here, the relative extreme point CP1 of the beam splitting surface BS is the lowest point of a cross section of the beam splitting surface BS shown in FIG. 2B with the diagonal line of the rectangle RL as the cross-sectional line, that is, the position farthest from the light emitting elements 220 on the beam splitting surface BS shown in FIG. 1. In particular, the optical unit microstructures 110 are, for example, arranged in a matrix and connected to each other. For example, the side surface SS1 of the optical unit microstructure 110 is connected to the side surface SS3 of the adjacent optical unit microstructure 110 (that is, the endpoint P1 of the optical unit microstructure 110 share the same point with the endpoint P2 of the adjacent optical unit microstructure 110), thereby forming a matrix arrangement (for example, a two-dimensional matrix arrangement). For example, the optical unit microstructures 110 are integrally-formed structure.

Moreover, as shown in FIG. 2A and FIG. 2B, in the embodiment, on a section surface (the section surface is, for example, perpendicular to the first surface S1 of the substrate 120) with the diagonal line of the rectangle RL (for example, the connection line of the endpoints P2 and P4) as a section line, the curve of the beam splitting curved surface CS is a sine curve, the endpoints P2 and P4 (and the endpoints P1 and P3) of the beam splitting surface BS are located at a relative extreme point of the sine curve (that is, the highest point of the beam splitting surface BS of the optical unit microstructure 110 shown in FIG. 2A and FIG. 2B), projections of perpendicular bisectors LM1 and LM2 of the edges of the rectangle RL on the beam splitting surface BS overlap with a projection of an intersection line of the adjacent beam splitting inclined surface TS on the beam splitting surface BS. In addition, as shown in FIG. 2A, in the embodiment, the beam splitting inclined surfaces TS include four triangular inclined surfaces to form an inwardly concave pyramid on the beam splitting surface BS. A vertex PMP of the pyramid is the relative extreme point CP1 of the beam splitting surface BS (that is, the lowest point of the beam splitting surface BS of the optical unit microstructure 110 shown in FIG. 2A and FIG. 2B), and midpoints MP1, MP2, MP3, and MP4 of the four bottom sides of the pyramid are located on the diagonal lines of the rectangle RL and are a junction point with the sine curve. Moreover, as shown in FIG. 2B, in the embodiment, on the section surface with the diagonal line of the rectangle RL as the section line, the outline of the pyramid has a first included angle $\theta 1$, and the range of the first included angle $\theta 1$ is between 45 degrees and 135 degrees, and is preferably 90 degrees.

On the other hand, in the embodiment, the relative extreme point LSP1 of the first line segment LS1 is one other vertex among the vertices of the triangular inclined surface except for the vertex of the pyramid (that is, in the embodiment of the pyramid composed of four triangular inclined surfaces, the extreme points LSP1, LSP2, LSP3, and LSP4 are four vertices PM1, PM2, PM3, and PM4 of the pyramid), and is also a saddle point of the beam splitting curved surface CS. In this way, the edges of the inwardly concave pyramid just pass through inflection points (for example, the midpoints MP1, MP2, MP3, and MP4 and the extreme points LSP1, LSP2, LSP3, and LSP4) of the beam splitting curved surface CS. The edges of the pyramid are used as the boundary at this time, one half of the beam splitting surface BS of the optical unit microstructure 110 is the beam splitting curved surface CS, and the other half is the beam splitting inclined surface TS. The beam splitting curved surface CS is closer to the light emitting element 220 than the beam splitting inclined surface TS. The proportion of the beam splitting curved surface CS and the beam splitting inclined surface TS in the optical unit microstructure 110 is approximately equal (e.g., orthographic projection areas of the beam splitting curved surfaces CS and the beam splitting inclined surfaces TS on the first surface S1 are approximately equal). Therefore, the beam splitting surface BS can simultaneously have the beam splitting characteristics of the beam splitting curved surface CS and the beam splitting inclined surface TS.

In this way, when the light emitting element 220 emits light, the light beam may pass through the beam splitting surface BS of the optical unit microstructure 110 of the optical structure film 100 to disperse the bright point formed by the light beam into the light spot. Also, in the embodiment, the brightness per unit area within the range of the light spot can be effectively reduced through the structural design of the beam splitting curved surface CS of the beam splitting surface BS of the optical unit microstructure 110. Also, in the embodiment, the optical unit microstructures 110 may be closely arranged, so that alignment with the light emitting element 220 is not required, and the requirements for mounting precision of the light emitting element 220 and the tolerance of module assembly can be reduced. For example, the width of the light emitting element 220 is 2 times or more than 5 times the width of the optical unit microstructure 110. In addition, in the case where the spacing between the light emitting elements 220 is increased, no obvious bright point phenomenon occurs, thereby reducing costs due to the number of light emitting elements 220. Alternatively, in the case where the number of the light emitting elements 220 remains fixed and the spacing is smaller, the uniformity of the light emitting elements 220 can be further improved to implement better visual effect. Moreover, through the above configuration, the optical distance required by the light source module 200 can be effectively reduced, thereby reducing the module thickness of the light source module 200.

Accordingly, in the embodiment, the configuration of the optical unit microstructure 110 through which the light source module 200 passes can suppress the bright point phenomenon formed by the light emitting element 220, thereby enabling the light source module 200 to have the advantage of being thin and good visual effect and uniformity.

In addition, it is worth noting that in the foregoing embodiment, although the four vertices PM1, PM2, PM3, and PM4 of the bottom surface of the pyramid are exemplified as sharing the same point with the saddle point of the beam splitting curved surface CS, the disclosure is not limited thereto. In other embodiments, the four vertices PM1, PM2, PM3, and PM4 on the bottom surface of the pyramid may not share the same points with the relative extreme points LSP1, LSP2, LSP3, and LSP4 of the first line segment LS1.

Figure 3:
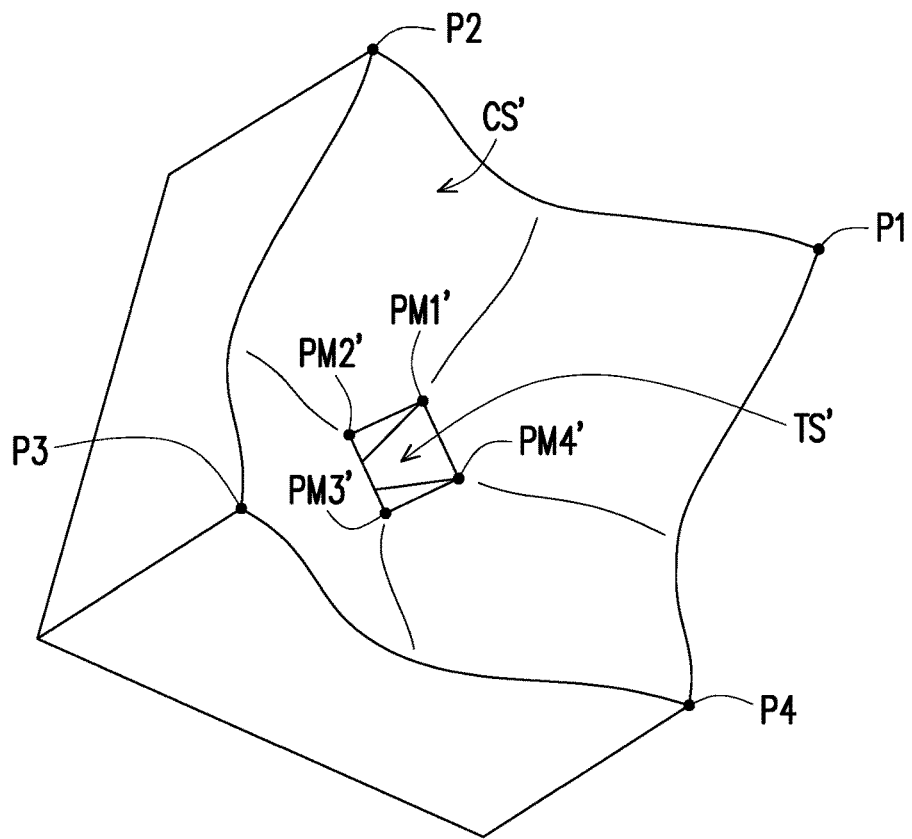
FIG. 3 is a schematic perspective view of an optical unit microstructure of another optical structure film of FIG. 1.

FIG. 3 is a schematic perspective view of an optical unit microstructure of another optical structure film of FIG. 1. Please refer to FIG. 3. An optical unit microstructure 310 of the embodiment is similar to the optical unit microstructure 110 of FIG. 2A, and the differences between the two are as follows. As shown in FIG. 3, in the embodiment, four vertices PM1', PM2', PM3', and PM4' of the bottom surface of the inwardly concave pyramid of the optical unit microstructure 310 may move toward the center of the beam splitting surface BS. In this way, the beam splitting characteristics contributed by a beam splitting inclined surface TS' will decrease, and the beam splitting characteristics of the optical unit microstructure 110 will be closer to the beam splitting characteristics exhibited by a beam splitting curved surface CS' formed by a free-form surface. In this way, when the optical unit microstructure 310 is applied to the optical structure film 100 of FIG. 1, the optical structure film 100 and the light source module 200 can also achieve the aforementioned effects and advantages, which are not repeated here. In other embodiments, the four vertices PM1', PM2', PM3', and PM4' of the bottom surface of the pyramid may move away from the center of the beam splitting surface BS, and the beam splitting characteristics of the optical unit microstructure 110 will be closer to the beam splitting characteristics exhibited by the beam splitting inclined surface TS'.

In addition, in the foregoing embodiments, although the beam splitting inclined surfaces TS and TS' are exemplified by the structures constituting the pyramids, the disclosure is not limited thereto. In other embodiments, each beam splitting inclined surface TS may also form different structures.

Figure 4A:
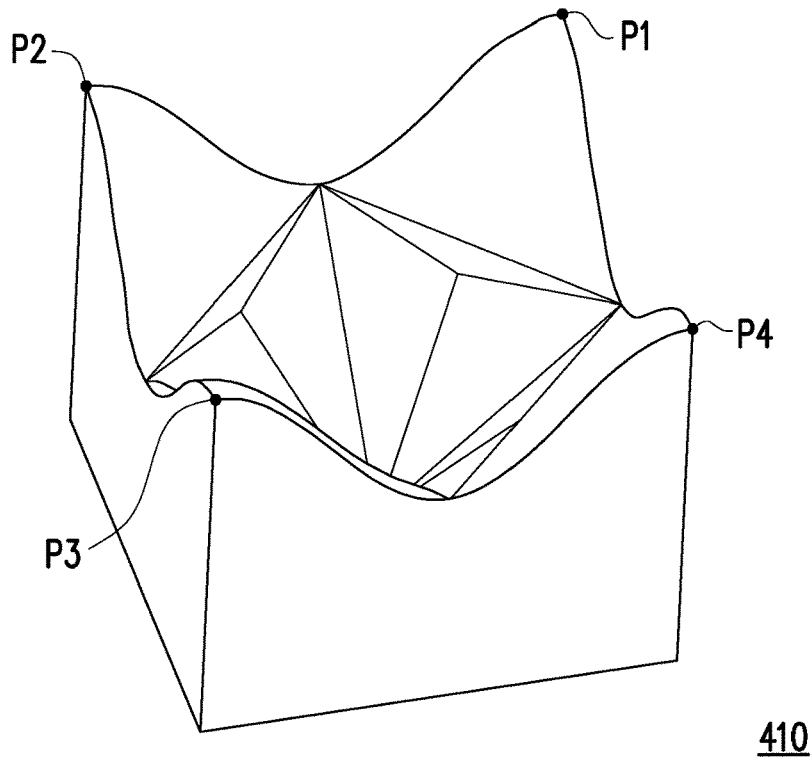
FIG. 4A and FIG. 4B are schematic perspective views of the optical unit microstructure of another optical structure film of FIG. 1 under different viewing angles.
Figure 4B:
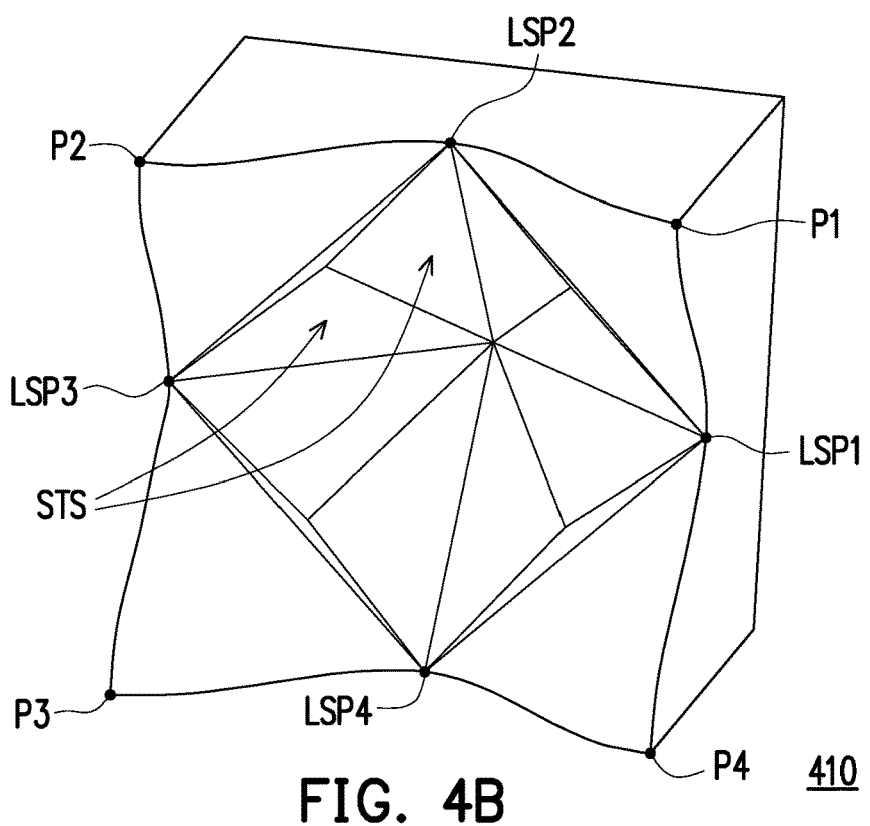
Figure 4C:
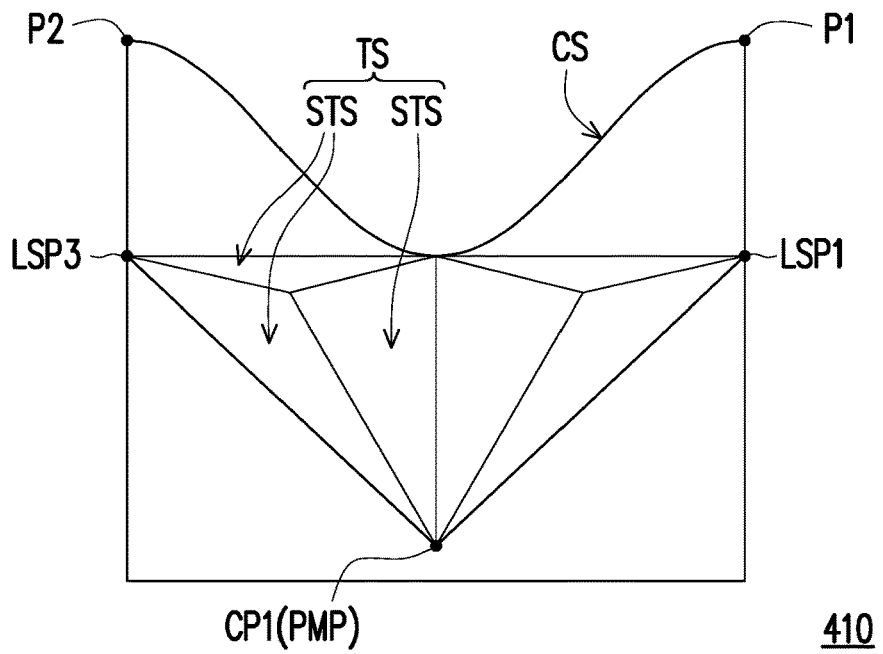
FIG. 4C is a cross-sectional view of the optical unit microstructure of FIG. 4A with a connection line passing through midpoints of two side surfaces of the microstructure as a cross-sectional line.

FIG. 4A and FIG. 4B are schematic perspective views of an optical unit microstructure of an optical structure film of FIG. 1 under different viewing angles. FIG. 4C is a cross-sectional view of the optical unit microstructure of FIG. 4A with a connection line passing through midpoints of two side surfaces of the microstructure as a cross-sectional line. Please refer to FIG. 4A to FIG. 4C. An optical unit microstructure 410 of the embodiment is similar to the optical unit microstructure 110 of FIG. 2A, and the differences between the two are as follows. As shown in FIG. 4A to FIG. 4C, in the embodiment, each beam splitting inclined surface TS has multiple sub inclined surfaces STS, and projections of the diagonal lines of the rectangle formed by the connection lines of the four endpoints P1, P2, P3, and P4 on the beam splitting surface BS overlaps with a projection of an intersection line of the adjacent sub inclined surface STS (for example, the sub inclined surface STS with the relative extreme point CP1 as the vertex) of each of the beam splitting inclined surfaces TS on the beam splitting surface BS. In other words, as shown in FIG. 4A to FIG. 4C, the sub inclined surfaces STS of the beam splitting inclined surfaces TS may form an inwardly concave polyhedron pyramid-shaped structure on the beam splitting surface BS. In the embodiment, the pyramid-shaped structure has, for example, twelve sub inclined surfaces STS, wherein the vertices of the eight sub inclined surfaces STS share the same point with the relative extreme point CP1 of the beam splitting surface BS (that is, the lowest point of the beam splitting surface BS of the optical unit microstructure 410 shown in FIG. 4C).

In this way, since the slope changes of the sub inclined surfaces STS of the pyramid-shaped structure and the beam splitting surface CS are spatially displaced, through increasing the number of the sub inclined surfaces STS, the beam splitting effect of the optical unit microstructure 410 can be increased. In this way, when the optical unit microstructure 410 is applied to the optical structure film 100 of FIG. 1, the optical structure film 100 and the light source module 200 can also achieve the aforementioned effects and advantages, which are not repeated here.

Figure 5A:
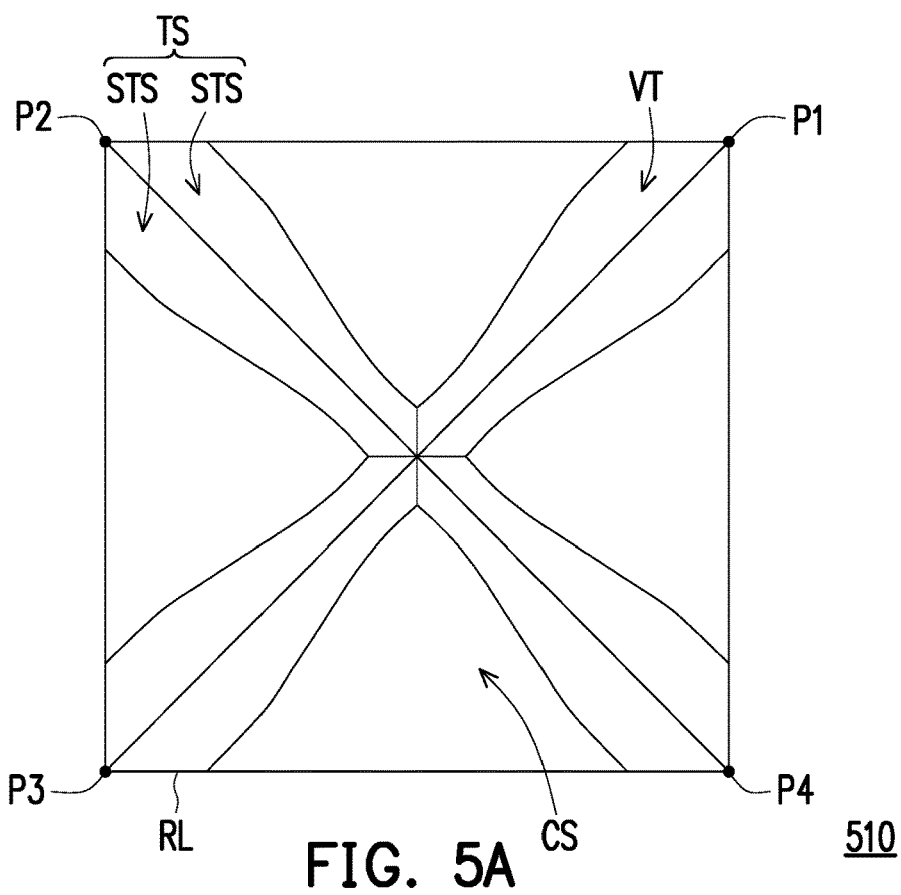
FIG. 5A to FIG. 5C are schematic perspective views of the optical unit microstructure of another optical structure film of FIG. 1 under different viewing angles.
Figure 5B:
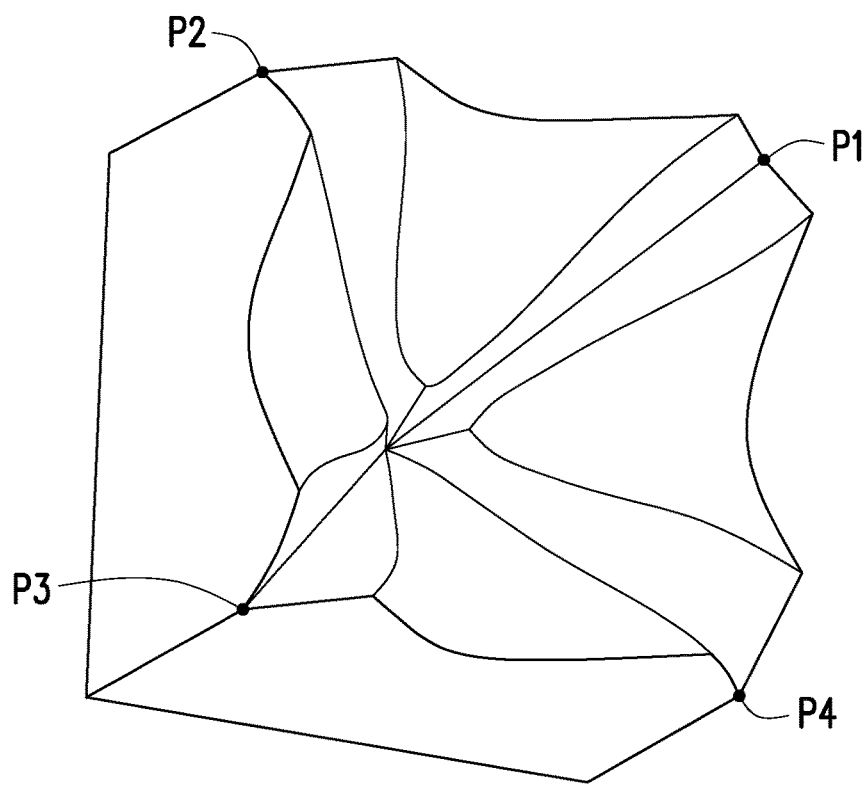
Figure 5C:
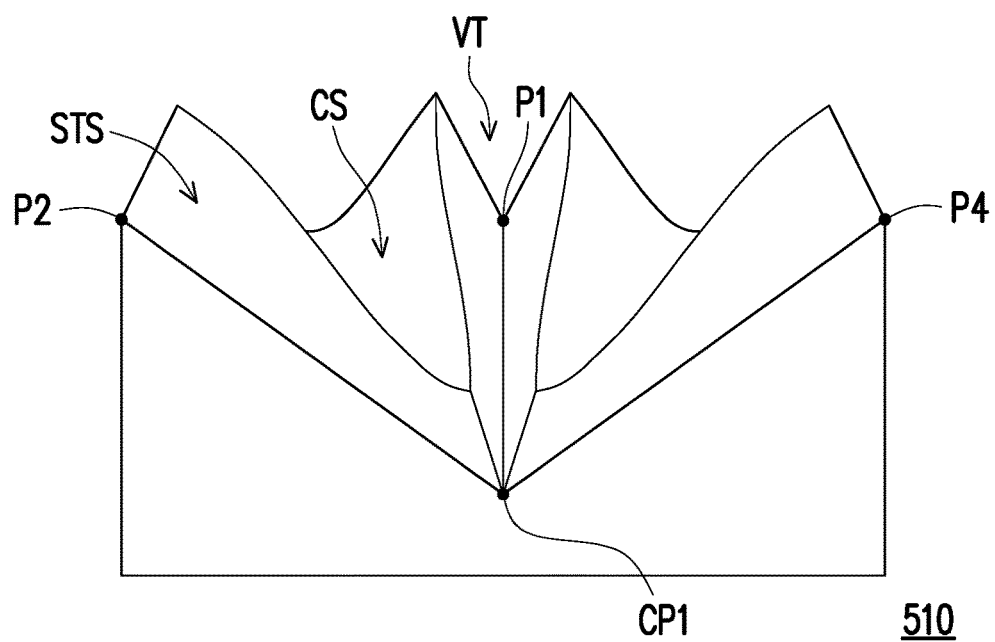
Figure 5D:
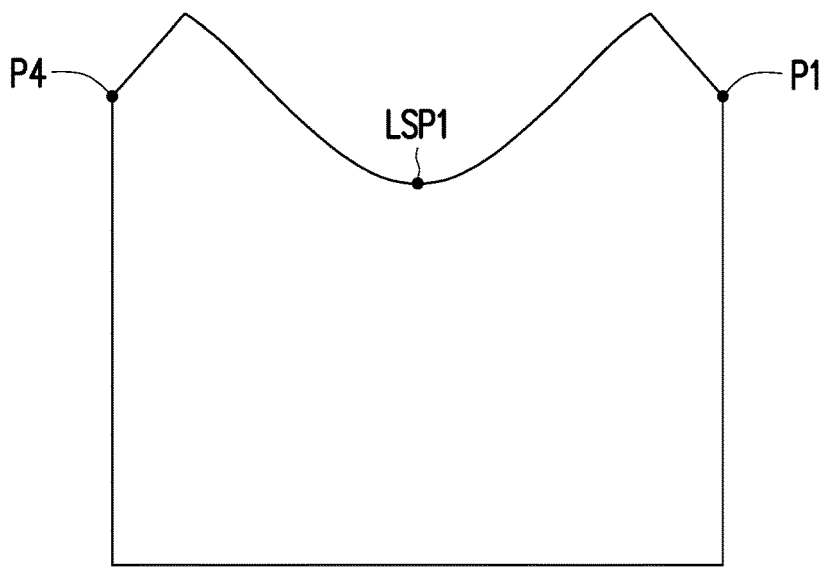
FIG. 5D is a cross-sectional view of the optical unit microstructure of FIG. 5A with a diagonal line of a rectangle as a cross-sectional line.
Figure 5E:
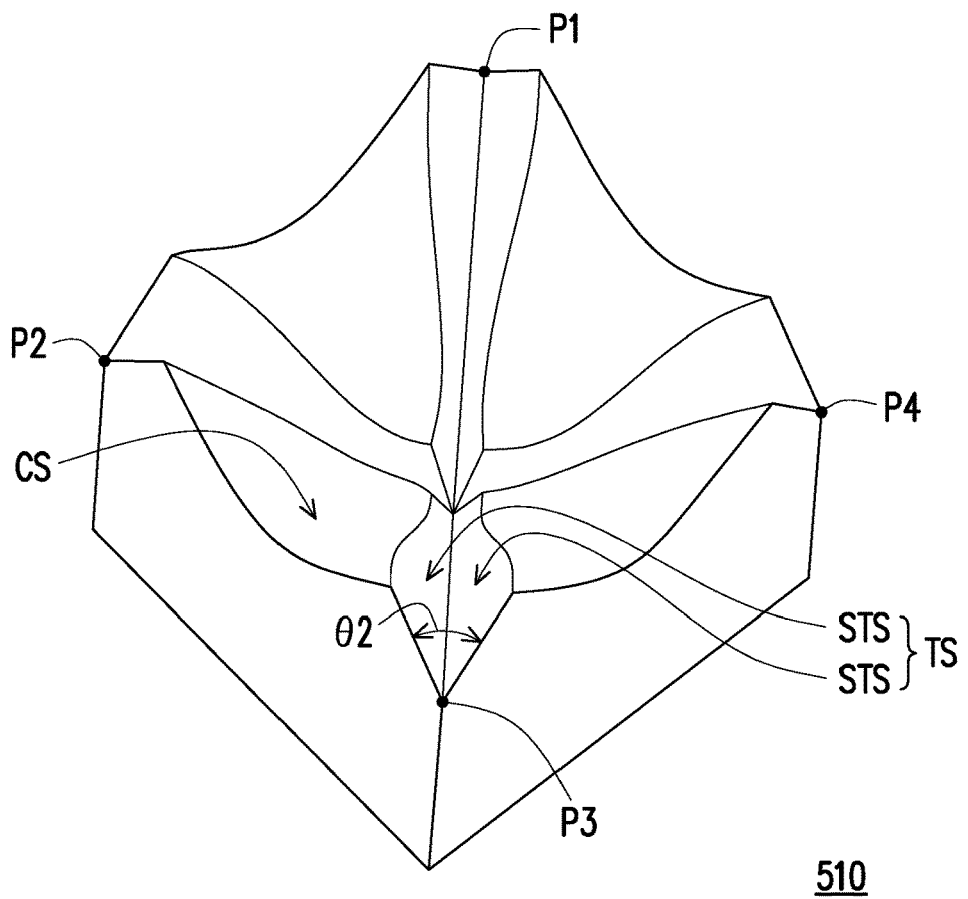
FIG. 5E is a side view of the optical unit microstructure of FIG. 5A.

FIG. 5A to FIG. 5C are schematic perspective views of the optical unit microstructure of another optical structure film of FIG. 1 under different viewing angles. FIG. 5D is a cross-sectional view of the optical unit microstructure of FIG. 5A with a diagonal line of a rectangle as a cross-sectional line. FIG. 5E is a side view of the optical unit microstructure of FIG. 5A. Please refer to FIG. 5A to FIG. 5E. An optical unit microstructure 510 of the embodiment is similar to the optical unit microstructure 110 of FIG. 2A, and the differences between the two are as follows. As shown in FIG. 5A to FIG. 5E, in the embodiment, each of the beam splitting inclined surfaces TS includes two sub inclined surfaces STS. The two sub inclined surfaces STS of each of the beam splitting inclined surfaces TS respectively form a V-shaped groove structure VT. A relative extreme point of each V-shaped groove structure VT is located at the relative extreme point CP1 of the beam splitting surface BS (as shown in FIG. 5C), and at least one beam splitting curved surface CS is divided into multiple beam splitting sub curved surfaces (for example, 4) by each V-shaped groove structure VT. Further, in the embodiment, the projections of the diagonal lines of the rectangle formed by the connection lines of the four endpoints P1, P2, P3, and P4 on the beam splitting surface BS overlap with the projection of the intersection line of the two sub inclined surfaces STS of each of the beam splitting inclined surfaces TS on the beam splitting surface BS. The highest point (relative extreme point) of the beam splitting surface BS of the optical unit microstructure 110 shown in FIG. 5C is a junction point of each V-shaped groove structure VT and the beam splitting sub curved surface. The four endpoints P1, P2, P3, and P4 of the beam splitting surface BS are respectively one vertex of each V-shaped groove structure VT. In the embodiment, there is a second included angle θ2 between the two sub inclined surfaces STS of each of the beam splitting inclined surfaces TS, and the range of the second included angle θ2 is between 45 degrees and 135 degrees, and is preferably 50 degrees. In this way, through setting the V-shaped groove structure VT, the number of the beam splitting inclined surfaces TS and the sub inclined surfaces STS thereof can be increased, thereby improving the beam splitting effect of the optical unit microstructure 510. Moreover, when the optical unit microstructure 510 is applied to the optical structure film 100 of FIG. 1, the optical structure film 100 and the light source module 200 can also achieve the aforementioned effects and advantages, which are not repeated here.

Figure 6A:
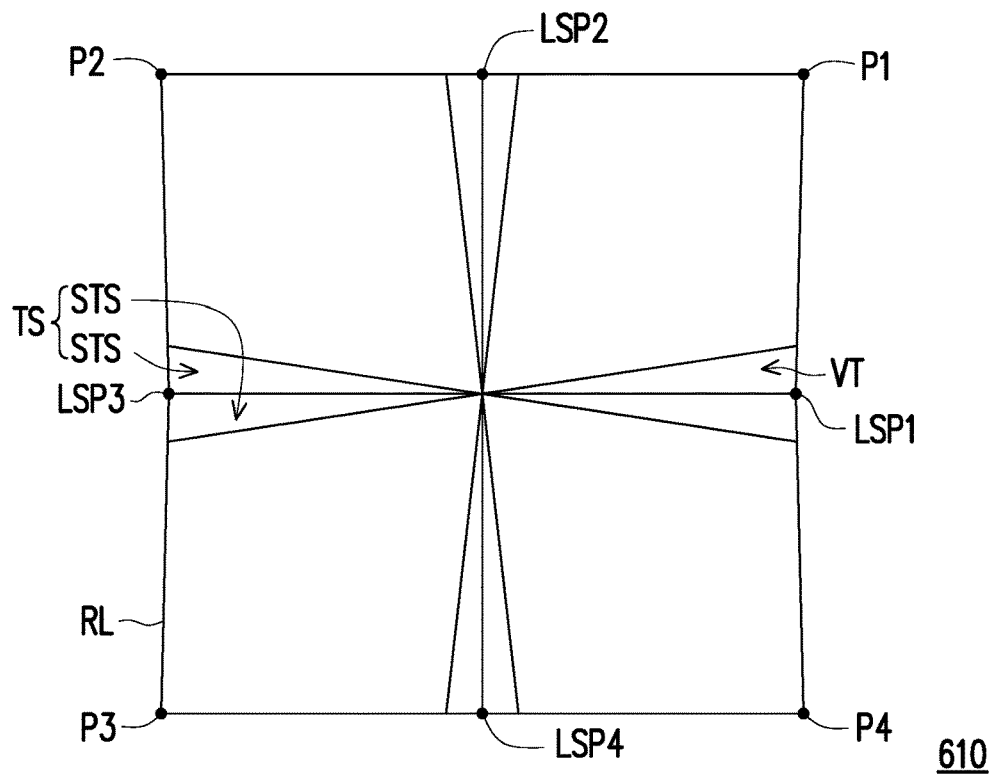
FIG. 6A is a schematic front view of an optical unit microstructure of another optical structure film of FIG. 1.
Figure 6B:
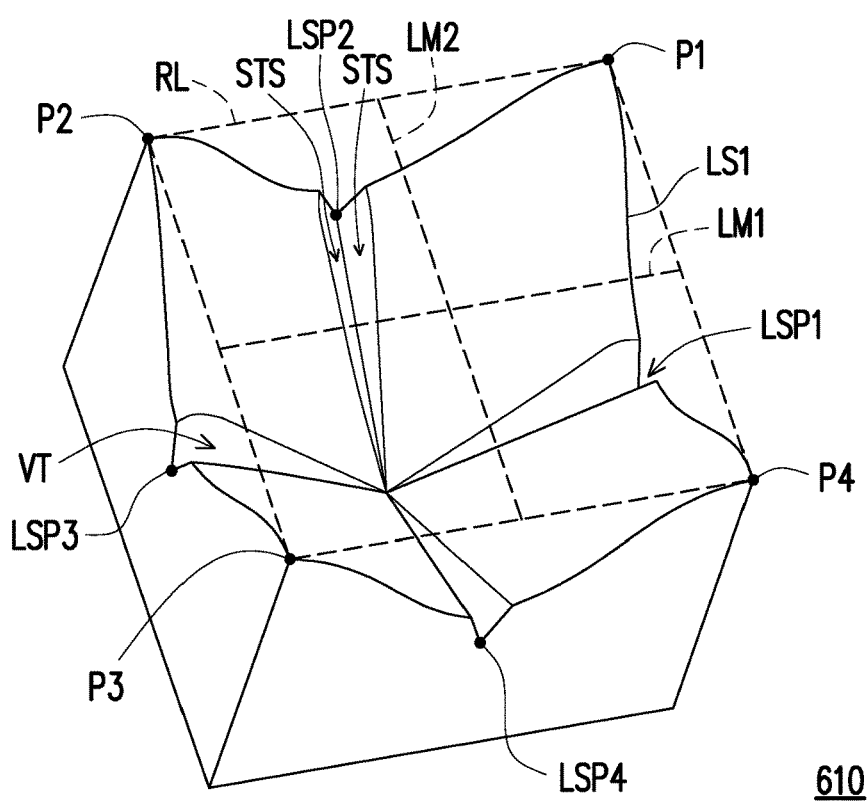
FIG. 6B is a schematic perspective view of the optical unit microstructure of FIG. 6A.
Figure 6C:
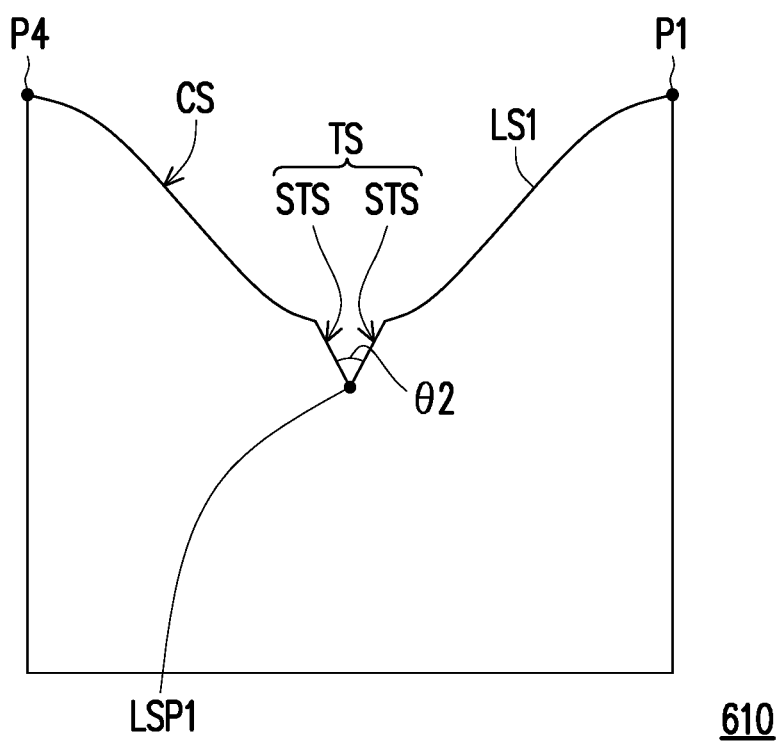
FIG. 6C is a side view of the optical unit microstructure of FIG. 6A.

FIG. 6A is a schematic front view of an optical unit microstructure of another optical structure film of FIG. 1. FIG. 6B is a schematic perspective view of the optical unit microstructure of FIG. 6A. FIG. 6C is a side view of the optical unit microstructure of FIG. 6A. Please refer to FIGS. 6A to 6C. An optical unit microstructure 610 of the embodiment is similar to the optical unit microstructure 510 of FIG. 5A, and the differences between the two are as follows. As shown in FIG. 6A to FIG. 6C, in the embodiment, the perpendicular bisectors LM1 and LM2 of the edges of the rectangle RL overlap with the projection of the intersection line of the two sub inclined surfaces STS of each of the beam splitting inclined surfaces TS on the beam splitting surface BS, and the relative extreme points LSP1, LSP2, LSP3, and LSP4 of the first line segment LS1 are one vertex of the V-shaped groove structure VT. In the embodiment, there is the second included angle θ2 between the two sub inclined surfaces STS, and the range of the second included angle θ2 is between 45 degrees and 135 degrees. In this way, through the setting of the V-shaped groove structure VT, the number of the beam splitting inclined surfaces TS and the sub inclined surfaces STS thereof can be increased, thereby increasing the beam splitting effect of the optical unit microstructure 110. Moreover, when the optical unit microstructure 110 is applied to the optical structure film 100 of FIG. 1, the optical structure film 100 and the light source module 200 can also achieve the aforementioned effects and advantages, which are not repeated here.

Figure 7:
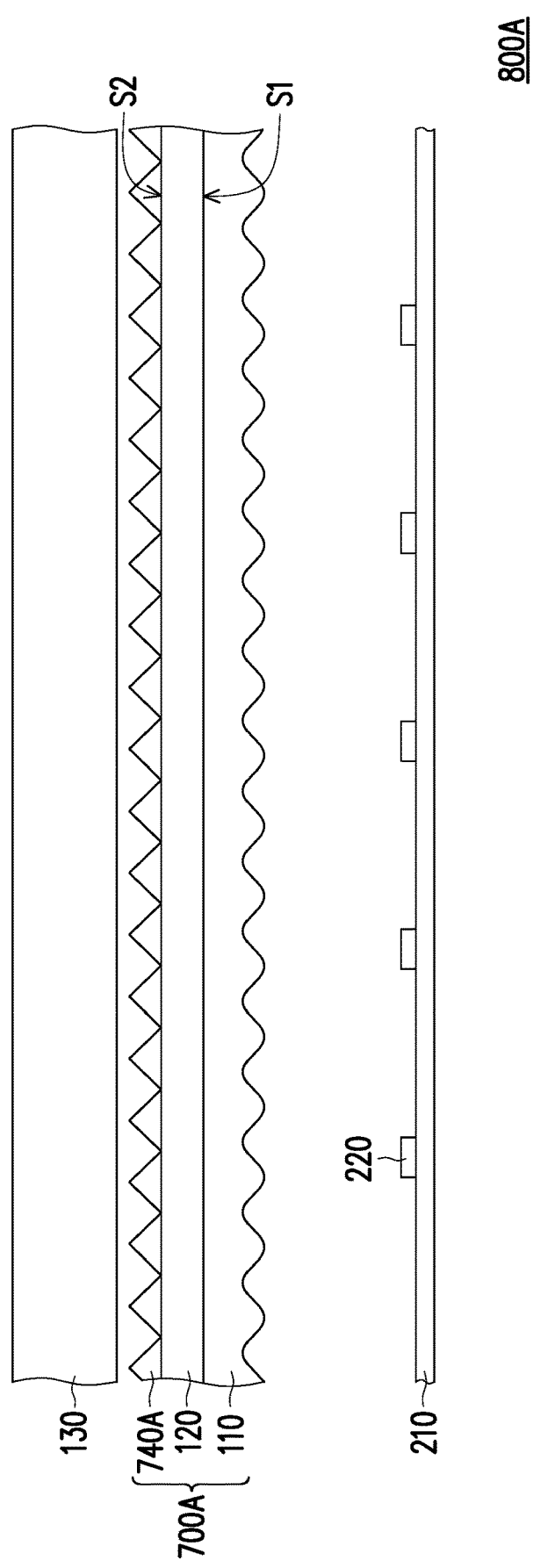
FIG. 7 is a schematic view of an architecture of another light source module according to an embodiment of the disclosure.

FIG. 7 is a schematic view of an architecture of another light source module according to an embodiment of the disclosure. Please refer to FIG. 7. A light source module 800A of the embodiment is similar to the light source module 200 of FIG. 1, and the differences between the two are as follows. As shown in FIG. 7, in the embodiment, the second surface S2 of the substrate 120 of an optical structure film 700A is formed with multiple prism microstructures 740A. In this way, through the setting of the prism microstructure 740A, a light emitting angle of the light beam passing through the optical unit microstructure 110 may be forwarded, thereby increasing the brightness of the light source module 800A at the front viewing angle. In addition, in the embodiment, the light beam may also pass through the beam splitting surface BS of the optical unit microstructure 110 of the optical structure film 700A to disperse the bright point formed by the light beam into the light spot. Also, through the structural design of the beam splitting curved surface CS of the beam splitting surface BS of the optical unit microstructure 110, the brightness per unit area within the range of the light spot can be effectively reduced, so that the optical structure film 700A and the light source module 800A can have the aforementioned advantages of the optical structure film 100 and the light source module 200, which are not repeated here.

Figure 8:
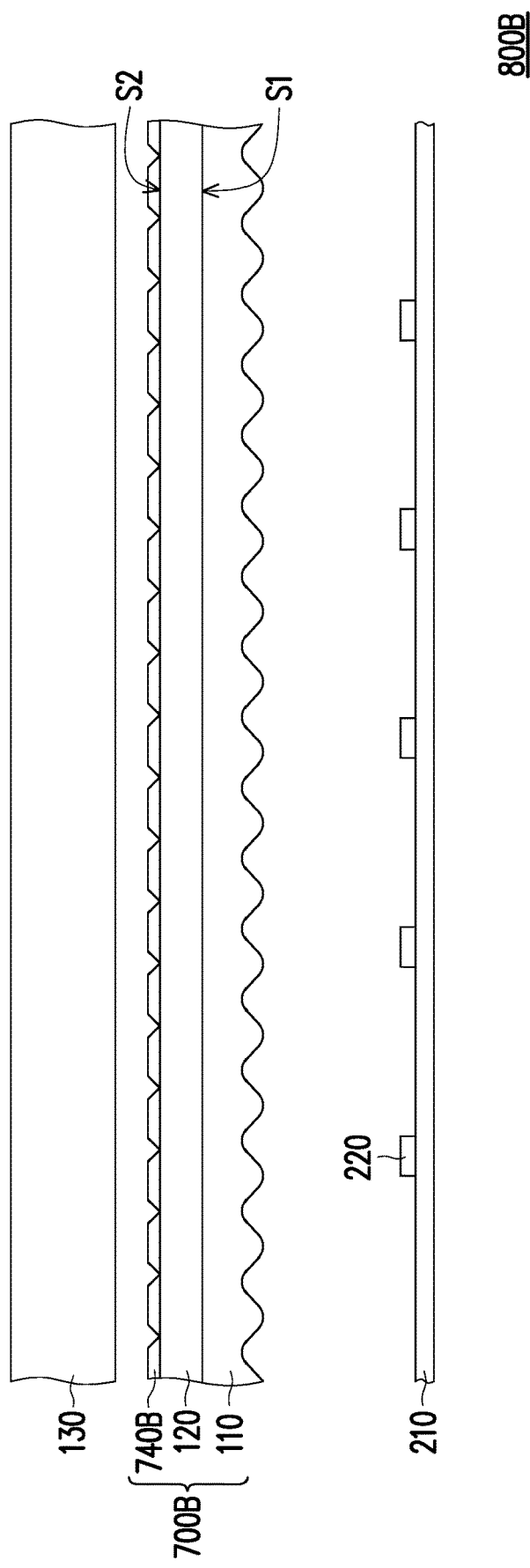
FIG. 8 is a schematic view of an architecture of yet another light source module according to an embodiment of the disclosure.
Figure 9A:
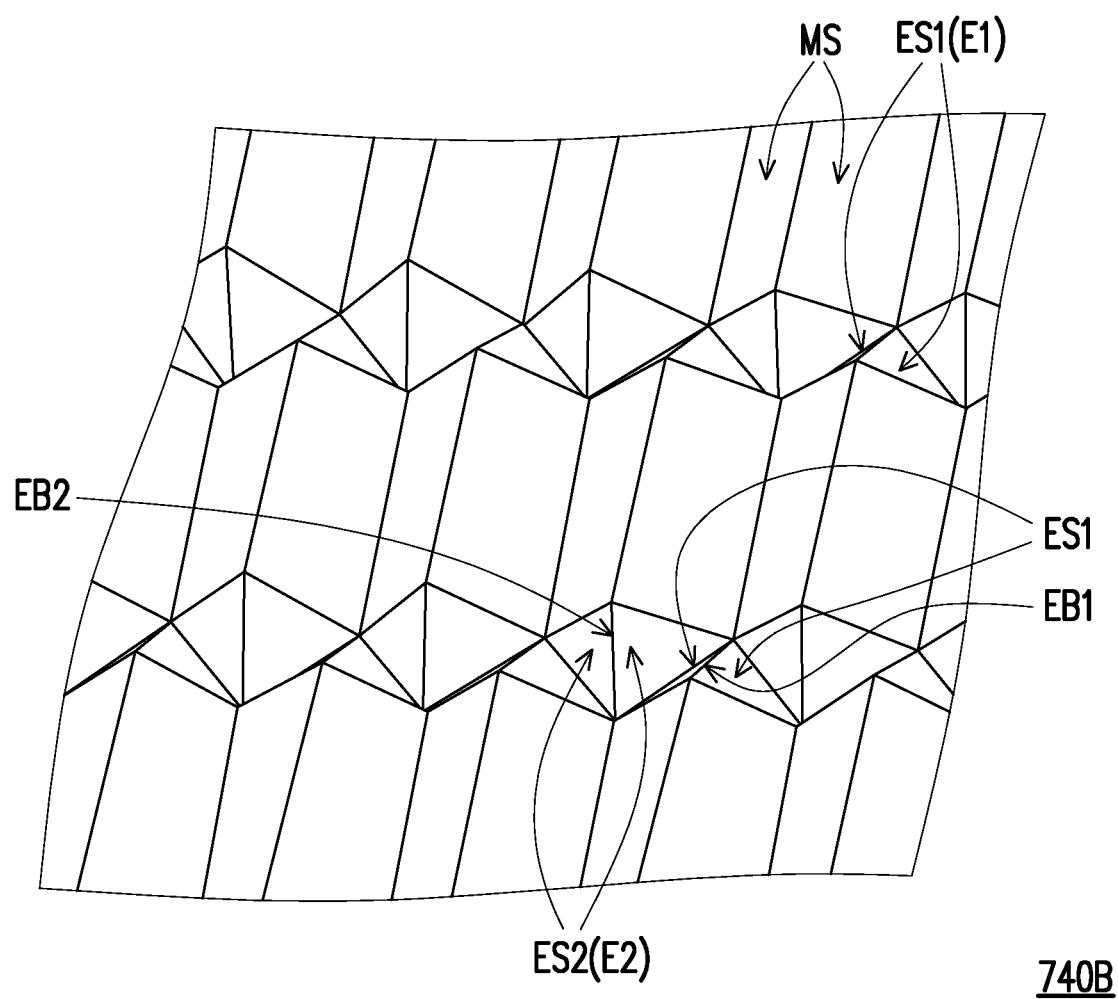
FIG. 9A is a schematic view of an arrangement of multiple prism microstructures of FIG. 8.
Figure 9B:
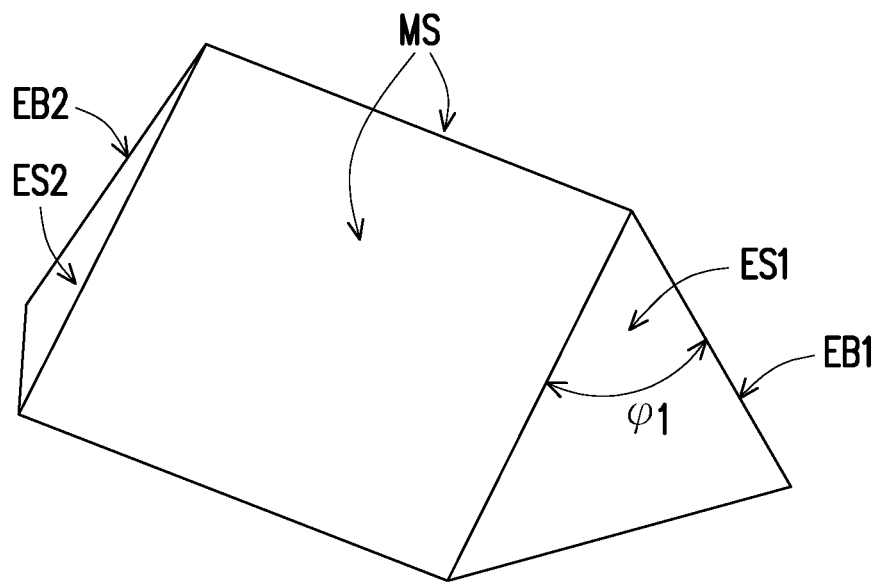
FIG. 9B and FIG. 9C are side views of the single prism microstructure of FIG. 9A under different viewing angles.
Figure 9C:
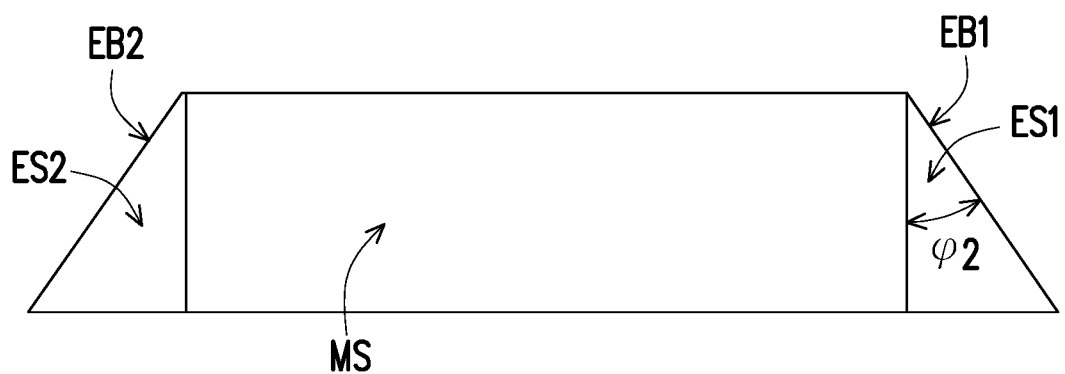

FIG. 8 is a schematic view of an architecture of yet another light source module according to an embodiment of the disclosure. FIG. 9A is a schematic view of an arrangement of multiple prism microstructures of FIG. 8. FIG. 9B and FIG. 9C are side views of the single prism microstructure of FIG. 9A under different viewing angles. Please refer to FIG. 8. A light source module 800B and an optical structure film 700B of the embodiment are respectively similar to the light source module 800A and the optical structure film 700A of FIG. 7, and the differences between the two are as follows. As shown in FIG. 8, in the embodiment, multiple prism microstructures 740B of the substrate 120 of the optical structure film 700B are arranged in an array and arranged into multiple rows, and the prism microstructures 740B in adjacent rows are displaced from each other.

Further, as shown in FIG. 9A to FIG. 9C, in the embodiment, each of the prism microstructures 740B has multiple main inclined surfaces MS extending in an extending direction, and a first end E1 and a second end E2 of each of the prism microstructures 740B in the extending direction respectively have multiple inclined planes ES1 and ES2. When the first ends E1 of the prism microstructures 740B in one row are adjacently connected to the second ends E2 of the prism microstructures 740B in another row, the inclined planes ES1 of the first ends E1 of the prism microstructures 740B in the one row in the extending direction are connected with the inclined planes ES2 of the second ends E2 of the prism microstructures 740B in the other row in the extending direction. Further, as shown in FIG. 9B and FIG. 9C, in the embodiment, the inclined planes ES1 and ES2 are triangle, and vertex angles φ1 of the inclined planes ES1 and ES2 are between 45 degrees and 135 degrees, and are preferably 70 degrees. An included angle φ2 between a junction EB1 (or a junction EB2) of the inclined plane ES1 (or the inclined plane ES2) and a plumb line at the same end in the extending direction is between 0 degrees and 90 degrees, and is preferably 35 degrees.

In this way, through the setting of the prism microstructure 740B, the light emitting angle of the light beam passing through the optical unit microstructure 110 can also be condensed, thereby increasing the brightness of the light source module 800B at the front viewing angle. In addition, in the embodiment, the light beam may also pass through the beam splitting surface BS of the optical unit microstructure 110 of the optical structure film 700B to disperse the bright point formed by the light beam into the light spot. Also, through the structural design of the beam splitting curved surface CS of the beam splitting surface BS of the optical unit microstructure 110, the brightness per unit area within the range of the light spot can be effectively reduced, so that the optical structure film 700B and the light source module 800B can have the aforementioned advantages of the optical structure film 700A and the light source module 800A, which are not repeated here. In addition, in the embodiment, since the prism microstructures 740B are arranged in a two-dimensional displaced array, the generation of a ghost image can be avoided, and a certain degree of light spot fogging effect can be provided, thereby more effectively suppressing the bright spot phenomenon formed by the light emitting element 220.

Figure 10A:
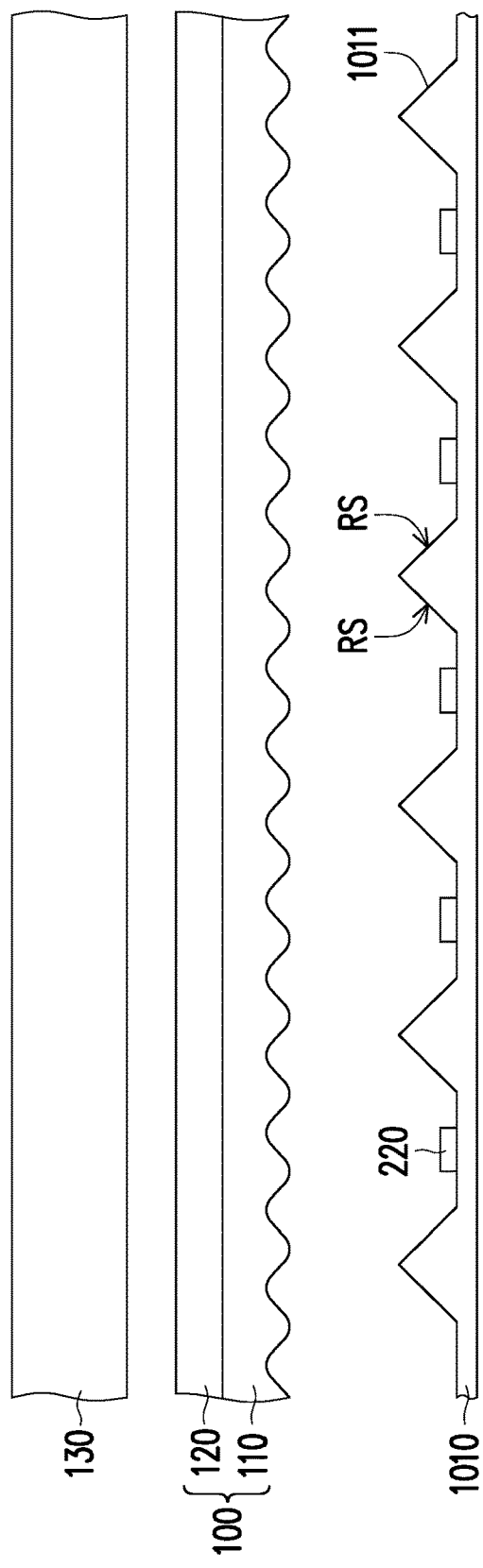
FIG. 10A is a schematic view of an architecture of yet another light source module according to an embodiment of the disclosure.
Figure 10B:
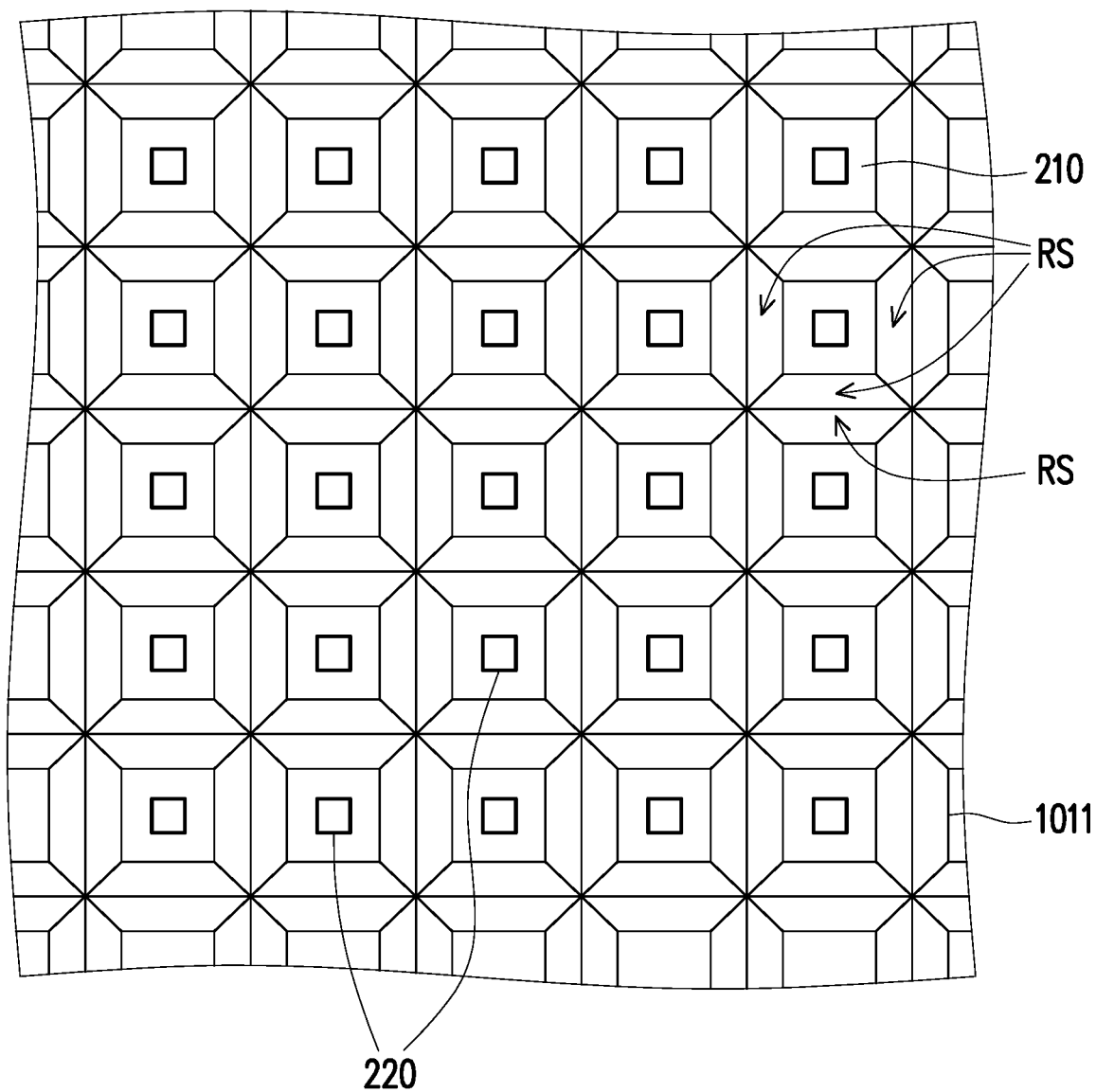
FIG. 10B is a schematic front view of a grating structure of FIG. 10A.

FIG. 10A is a schematic view of an architecture of yet another light source module according to an embodiment of the disclosure. FIG. 10B is a schematic front view of a grating structure of FIG. 10A. Please refer to FIG. 10A and FIG. 10B. A light source module 1000 of the embodiment is similar to the light source module 200 of FIG. 1, and the differences between the two are as follows. As shown in FIG. 10A and FIG. 10B, in the embodiment, the light source module 1000 further includes multiple grating structures 1011. The grating structures 1011 are located on a light emitting element substrate 1010, and each of the grating structures 1011 has multiple reflection surfaces RS. As shown in FIG. 10B, multiple light emitting elements 220 are respectively located in each of the grating structures 1011 and are respectively surrounded by the reflection surfaces RS of each of the grating structures 1011. In addition, through the design of the angle of the reflection surface RS of the grating structure 1011, the incident angle of the light emitting element 220 incident on the optical unit microstructure 110 may be adjusted, thereby improving the light emitting efficiency. In addition, in the embodiment, the light beam may also pass through the beam splitting surface BS of the optical unit microstructure 110 of the optical structure film 100 to disperse the bright point formed by the light beam into the light spot. Also, through the structural design of the beam splitting curved surface CS of the beam splitting surface BS of the optical unit microstructure 110, the brightness per unit area within the range of the light spot can be effectively reduced, so that the light source module 1000 can have the aforementioned advantages of the light source module 200, which are not repeated here. In addition, through adjusting the optical parameters of the grating structure 1011, the matching degree of the incident angle of the light emitting element 220 incident on the optical unit microstructure 110 can be improved, thereby further improving the uniformity of the light source module 200.

In addition, the optical unit microstructures 310, 410, 510, and 610 may also be applied to the light source modules 800A, 800B, and 1000 of FIG. 7 to FIG. 10B to replace the optical unit microstructure 110. When the optical unit microstructures 310, 410, 510, and 610 are applied to the optical structure films 800A, 800B, and 1000 of FIG. 7 to FIG. 10B, the optical structure films 700A and 700B and the light source modules 800A, 800B, and 1000 can also achieve the aforementioned effects and advantages, which are not repeated here.

In summary, the embodiments of the disclosure have at least one of the following advantages or effects. In the embodiments of the disclosure, the light beam emitted by the light emitting element may pass through the beam splitting surface of the optical unit microstructure of the optical structure film to disperse the bright point formed by the light beam into the light spot. Also, through the structural design of the beam splitting curved surface of the beam splitting surface of the optical unit microstructure, the brightness per unit area within the range of the light speckle can be effectively reduced. In addition, the optical unit microstructures may be closely arranged, so that alignment is not required, and the requirements for mounting precision of the light emitting element and the tolerance of module assembly can be reduced. In addition, in the case where the spacing between the light emitting elements is increased, no obvious bright point phenomenon occurs, thereby reducing costs due to the number of light emitting elements. Alternatively, in the case where the number of light emitting elements remains fixed and the spacing is smaller, the uniformity of the light emitting elements can be further improved to implement better visual effect. Moreover, through the above configuration, the optical distance of the light source module can be effectively reduced, thereby reducing the module thickness of the light source module.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:
1. An optical structure film, comprising:
a plurality of optical unit microstructures, wherein each of the optical unit microstructures has four side surfaces and an inwardly concave beam splitting surface, the beam splitting surface is respectively connected to the four side surfaces and the beam splitting surface has four endpoints when viewed from a front viewing angle, connection lines of the four endpoints form a rectangle, and the beam splitting surface comprises:

at least one beam splitting curved surface, wherein a junction of the beam splitting surface and one of the four side surfaces is a first line segment, and a projection of a midpoint of an edge of the rectangle on the beam splitting surface overlaps with a relative extreme point of the first line segment.

2. The optical structure film according to claim 1, wherein each of the optical unit microstructures further comprises a plurality of beam splitting inclined surfaces, the beam splitting inclined surfaces intersect at a relative extreme point of the beam splitting surface, and a projection of an intersection point of diagonal lines of the rectangle on the beam splitting surface overlaps with a relative extreme point of the beam splitting surface.

3. The optical structure film according to claim 2, wherein on a section surface with a diagonal line of the rectangle as a section line, a curve of the beam splitting curved surface is a sine curve, the four endpoints of the beam splitting surface are located at a relative extreme point of the sine curve, and a perpendicular bisector of an edge of the rectangle overlaps with a projection of an intersection line of adjacent two of the beam splitting inclined surfaces on the beam splitting surface.

4. The optical structure film according to claim 3, wherein the beam splitting inclined surfaces comprise four triangular inclined surfaces, an inwardly concave pyramid is formed on the beam splitting surface, a vertex of the pyramid is a relative extreme point of the beam splitting surface, and a midpoint of a bottom side of the pyramid is located on a diagonal line of the rectangle and is a junction point with the sine curve.

5. The optical structure film according to claim 4, wherein on a section surface with a diagonal line of the rectangle as a section line, an outline of the pyramid has a first included angle, and a range of the first included angle is between 45 degrees and 135 degrees.

6. The optical structure film according to claim 4, wherein a relative extreme point of the first line segment is another vertex of each of the triangular inclined surfaces.

7. The optical structure film according to claim 4, wherein each of the beam splitting inclined surfaces has a plurality of sub inclined surfaces, and a diagonal line of the rectangle overlaps with a projection of an intersection line of adjacent two of the sub inclined surfaces of each of the beam splitting inclined surfaces on the beam splitting surface.

8. The optical structure film according to claim 2, wherein each of the beam splitting inclined surfaces comprises two sub inclined surfaces, the two sub inclined surfaces of each of the beam splitting inclined surfaces respectively form a V-shaped groove structure, a relative extreme point of each of the V-shaped groove structures is located at a relative extreme point of the beam splitting surface, and the at least one beam splitting curved surface is divided into a plurality of beam splitting sub curved surfaces by each of the V-shaped groove structures.

9. The optical structure film according to claim 8, wherein a diagonal line of the rectangle overlaps with a projection of an intersection line of the two sub inclined surfaces of each of the beam splitting inclined surfaces on the beam splitting surface, a relative extreme point of the beam splitting surface is a junction point of each of the V-shaped groove structures and the beam splitting sub curved surface, and the four endpoints of the beam splitting surface are respectively one vertex of each of the V-shaped groove structures.

10. The optical structure film according to claim 8, wherein a perpendicular bisector of an edge of the rectangle overlaps with a projection of an intersection line of the two sub inclined surfaces of each of the beam splitting inclined surfaces on the beam splitting surface, and a relative extreme point of the first line segment is one vertex of the V-shaped groove structure.

11. The optical structure film according to claim 8, wherein there is a second included angle between the two sub inclined surfaces, and a range of the second included angle is between 45 degrees and 135 degrees.

12. The optical structure film according to claim 1, further comprising a substrate, wherein the substrate has a first surface and a second surface back facing each other, and the optical unit microstructures are formed on the first surface.

13. The optical structure film according to claim 12, wherein the second surface is formed with a plurality of prism microstructures.

14. The optical structure film according to claim 13, wherein the prism microstructures are arranged in an array and arranged into a plurality of rows, and the prism microstructures in adjacent rows are displaced from each other.

15. The optical structure film according to claim 14, wherein a first end and a second end of each of the prism microstructures in an extending direction respectively have a plurality of inclined planes, and when first ends of the prism microstructures in one row are adjacently connected to second ends of the prism microstructures in another row, the inclined planes of the first ends of the prism microstructures in the one row in the extending direction are connected with the inclined planes of the second ends of the prism microstructures in the another column in the extending direction.

16. A light source module, comprising:
a plurality of light emitting elements, configured to provide a light beam; and
an optical structure film, located on a transmission path of the light beam, comprising:
  a substrate, having a first surface and a second surface back facing each other, wherein the first surface faces the light emitting elements; and
  a plurality of optical unit microstructures, wherein each of the optical unit microstructures has four side surfaces and an inwardly concave beam splitting surface, the beam splitting surface is respectively connected to the side surfaces and the beam splitting surface has four endpoints when viewed from a front viewing angle, connection lines of the four endpoints form a rectangle, and the beam splitting surface comprises:
    at least one beam splitting curved surface, wherein a junction of the beam splitting surface and one of the four side surfaces is a first line segment, and a projection of a midpoint of an edge of the rectangle on the beam splitting surface overlaps with a relative extreme point of the first line segment.

17. The light source module according to claim 16, wherein the light source module further comprises a diffusion film, the second surface of the substrate faces the diffusion film, the light source module further comprises a plurality of grating structures, each of the grating structures has a plurality of reflection surfaces, and the light emitting elements are respectively located in each of the grating structures and are respectively surrounded by the reflection surfaces of each of the grating structures.

* * * * *